US012669154B2

(12) United States Patent
Huang

(10) Patent No.: US 12,669,154 B2
(45) Date of Patent: Jun. 30, 2026

(54) PISTON PUSHING TOOL

(71) Applicant: SHIFUKANG INDUSTRIAL.CO., LTD., Taichung City (TW)

(72) Inventor: Shang-Yuan Huang, Taichung City (TW)

(73) Assignee: SHIFUKANG INDUSTRIAL.CO., LTD., Taichung City (TW)

( * ) Notice: Subject to any disclaimer, the term of this patent is extended or adjusted under 35 U.S.C. 154(b) by 393 days.

(21) Appl. No.: 18/500,778

(22) Filed: Nov. 2, 2023

(65) Prior Publication Data

US 2025/0146544 A1 May 8, 2025

(51) Int. Cl.
B25B 27/14 (2006.01)
F16D 65/00 (2006.01)

(52) U.S. Cl.
CPC .......... F16D 65/0043 (2013.01); B25B 27/14 (2013.01)

(58) Field of Classification Search
CPC ......... B25B 27/12; B25B 27/14; F16D 65/00; F16D 65/0043; B60T 1/06
See application file for complete search history.

(56) References Cited

U.S. PATENT DOCUMENTS

| | | | | |
|---|---|---|---|---|
| 6,212,977 B1 * | 4/2001 | Liou | .......................... | B25B 5/06 |
| | | | | 269/166 |
| 6,574,846 B1 * | 6/2003 | Kang | .................. | B25B 27/0035 |
| | | | | 29/256 |
| 11,512,749 B1 * | 11/2022 | Lewis | .................... | F16D 65/183 |
| 2006/0208407 A1 * | 9/2006 | Wang | ........................ | B25B 7/14 |
| | | | | 269/6 |
| 2021/0071725 A1 * | 3/2021 | Tseng | .................... | B25B 27/023 |

FOREIGN PATENT DOCUMENTS

| | | |
|---|---|---|
| TW | M591026 U | 2/2020 |
| TW | M615268 U | 8/2021 |

* cited by examiner

*Primary Examiner* — Tan Q Nguyen
(74) *Attorney, Agent, or Firm* — MUNCY, GEISSLER, OLDS & LOWE, P.C.

(57) ABSTRACT

A piston pushing tool is provided, wherein the piston pushing tool includes: two arm members being connected to each other, and being relatively movable to be close to each other or to be far away from each other; and two push members configured to be inserted between two objects and connected to the two arm members respectively, the two push members being movable with the two arm members to push the two objects, at least one of the two objects being a piston.

9 Claims, 4 Drawing Sheets

PISTON PUSHING TOOL

BACKGROUND OF THE INVENTION

Field of the Invention

The present invention relates to a piston pushing tool.

Description of the Prior Art

The disc brake system uses the brake pad in the caliper to clamp the brake disc to make a brake. As the brake pad wears and becomes thinner, the piston used to push the brake pad will be gradually protrusive from the caliper. When replacing the new brake pad it is necessary to reposition the piston into the caliper. The conventional way is to use hand tools, such as hammers and pry bars, to reposition the piston by impacting or urging. This often causes deformation and damage to the piston and reduces its durability. Therefore, some brake piston pushing tools (such as ones disclosed in TW M615268 and TW M591026) are developed.

However, the conventional brake piston pushing tool is actuated by a hydraulic cylinder, which results in a high cost. Besides, the fluid in the brake piston pushing tool will gradually deteriorate with use. Moreover, in order to avoid leakage of the fluid, the precision requirements for production and assembly are relatively higher, which increases the total cost. In addition, when the device is damaged, it is difficult to repair.

The present invention is, therefore, arisen to obviate or at least mitigate the above-mentioned disadvantages.

SUMMARY OF THE INVENTION

The main object of the present invention is to provide a piston pushing tool which can be push a piston back into the caliper stably and quickly, has a simple structure, good reliability and good durability, and is very convenient in maintenance.

To achieve the above and other objects, a piston pushing tool is provided, wherein the piston pushing tool includes: two arm members being connected to each other, and being relatively movable to be close to each other or to be far away from each other; and two push members configured to be inserted between two objects and connected to the two arm members respectively, the two push members being movable with the two arm members to push the two objects, at least one of the two objects being a piston.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
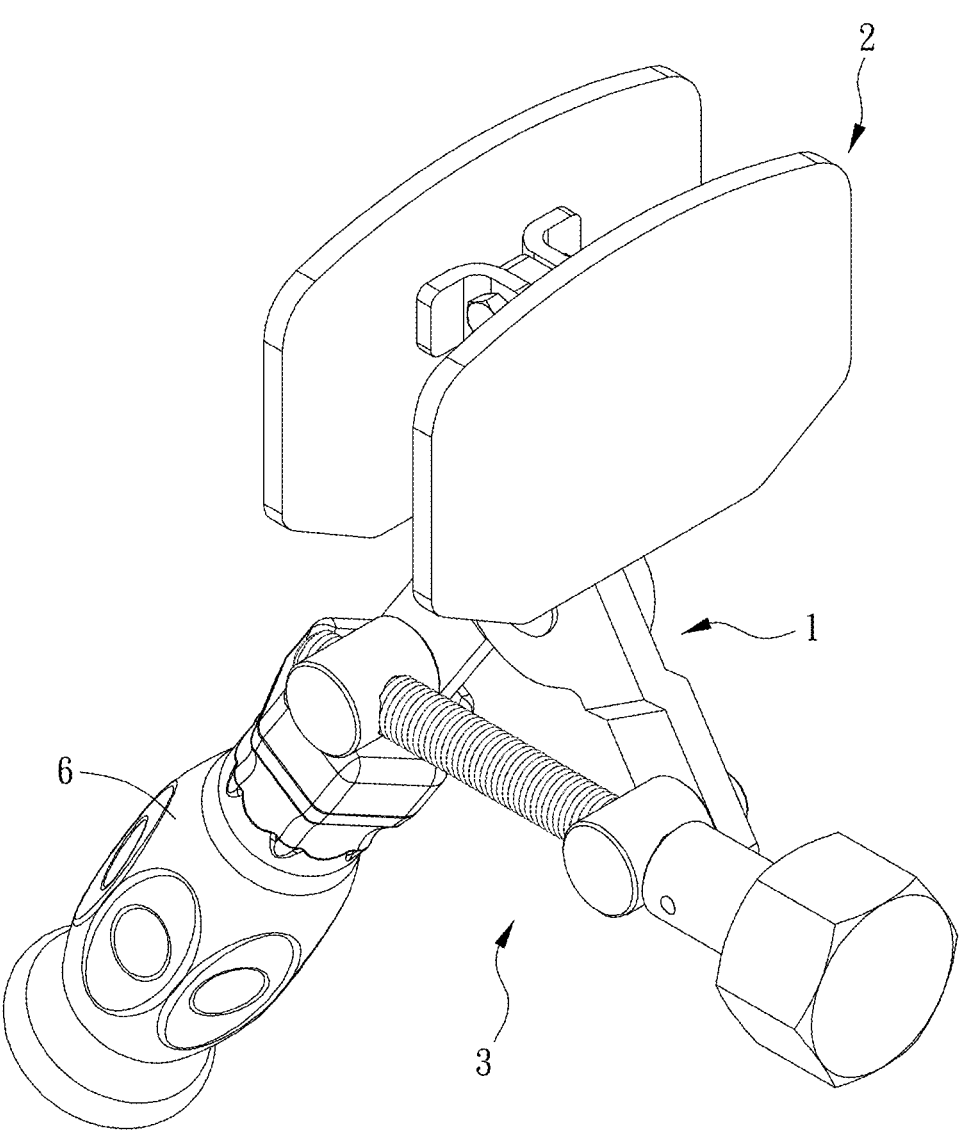
FIG. 1 is a stereogram of an exemplary embodiment of the present invention.
Figure 2:
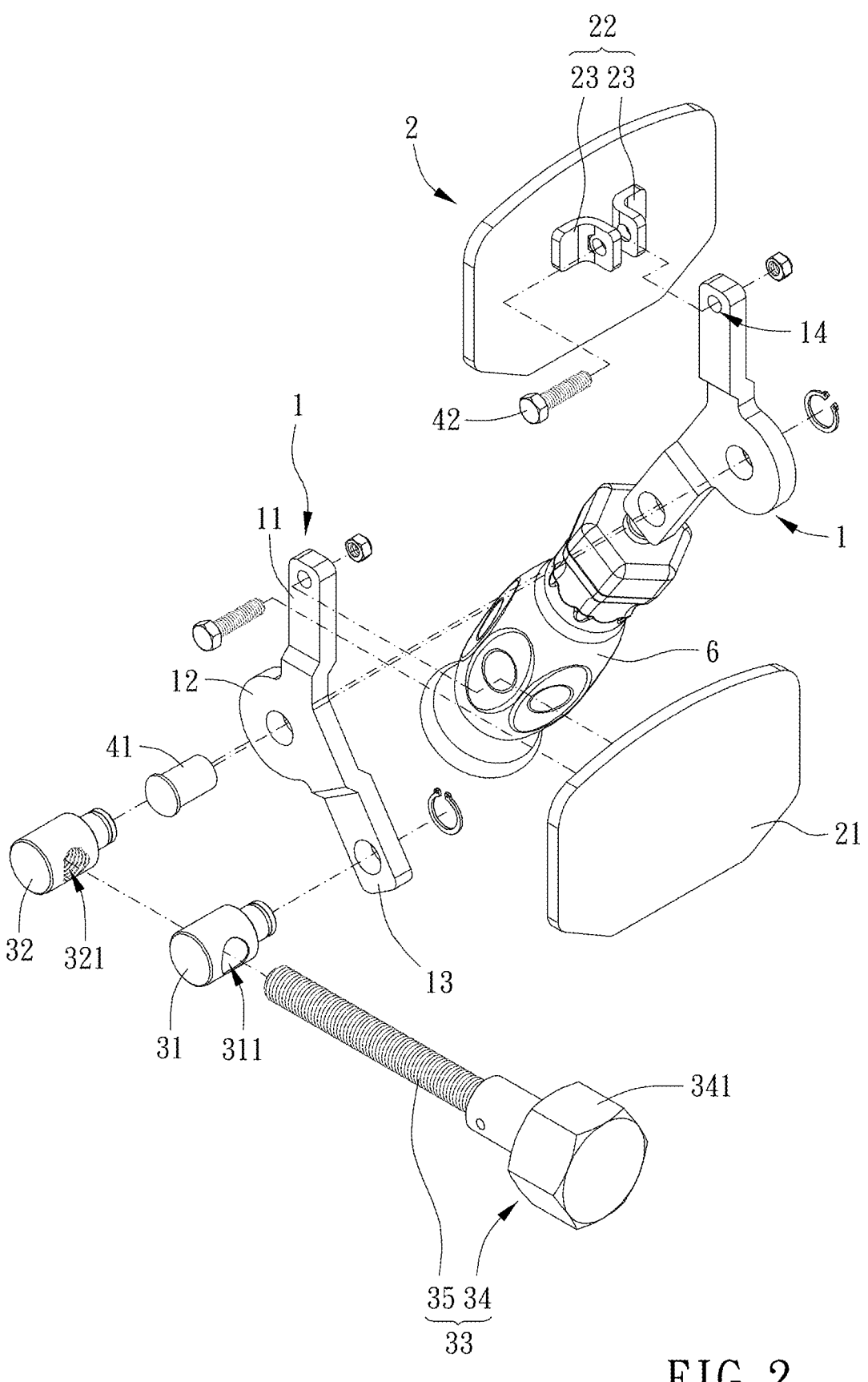
FIG. 2 is a breakdown drawing of an exemplary embodiment of the present invention.
Figure 3:
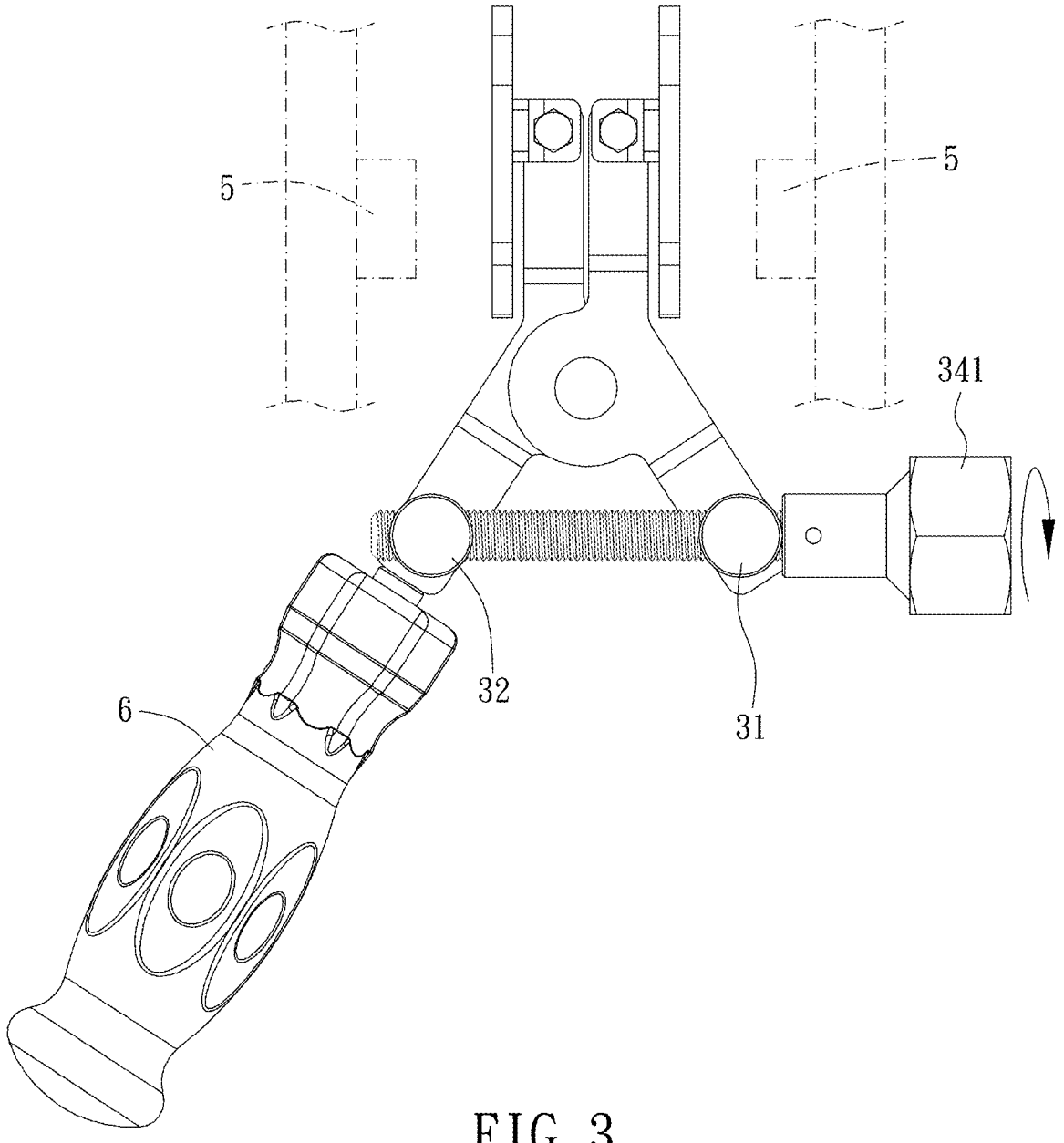
FIGS. 3 and 4 are drawings showing operation of a piston pushing tool of an exemplary embodiment of the present invention.
Figure 4:
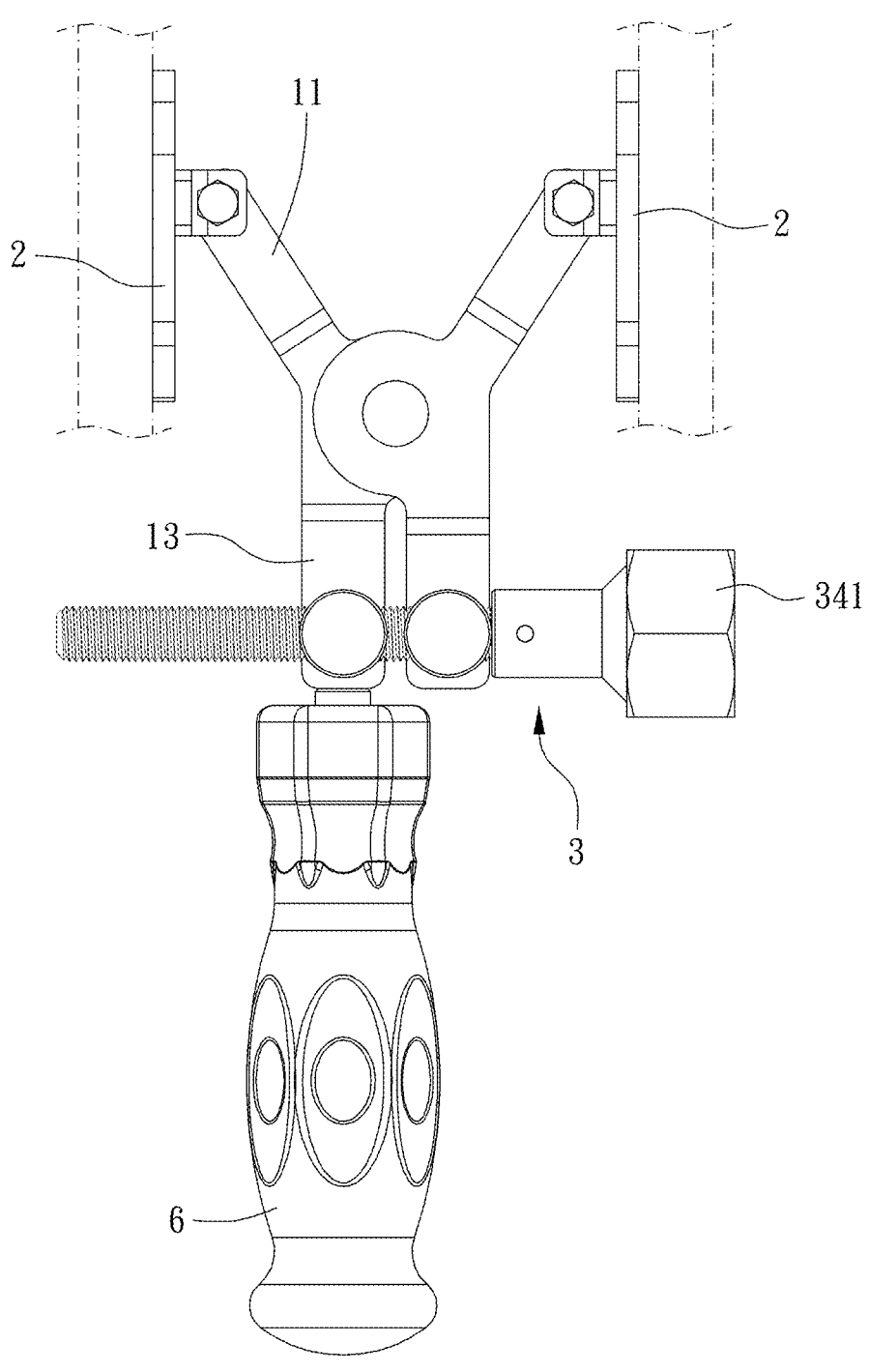

Please refer to FIGS. 1 to 4 for an exemplary embodiment of the present invention. A piston pushing tool of the present invention includes two arm members 1 and two push members 2.

The two arm members 1 are connected to each other, and are relatively movable to be close to each other or to be far away from each other. The two push members 2 are configured to be inserted between two objects 5 and connected to the two arm members 1 respectively. The two push members 2 are movable with the two arm members 1 to push the two objects 5, wherein at least one of the two objects 5 is a piston. In this embodiment, the two objects 5 are pistons, the two arm members 1 are made of metal, and the two push members 2 are made of metal so that it provides a strong structure and good durability.

Specifically, the piston pushing tool further includes a first pivot 41, and the first pivot 41 is disposed through the two arm members 1 and connects the two arm members 1 to each other. As such, it can quickly drive the two push members 2 to move, and has the advantage of rapid production and assembly. Specifically, each of the two arm members 1 includes a head portion 11, a body portion 12 and an operation portion 13 connected to one another in sequence. The operation portion 13 and the head portion 11 define an included angle larger than 110 degrees therebetween. The first pivot 41 is disposed through the body portion 12 of the two arm members 1. The two push members 2 are connected to the head portions 11 of the two arm members 1 respectively, and the head portions 11 of the two arm members 1 are located between the two push members 2. When the operation portions 13 of the two arm members 1 move to be close to each other, the head portions 11 of the two arm members 1 move to be far away from each other and drive the two push members 2 to push the two objects 5.

Preferably, the two push members 2 are rotatably connected to the head portions 11 of the two arm members 1, respectively. As such, when the head portions 11 of the two arm members 1 moves in an arcuate path and relatively far away from each other, the two push members 2 can rotate accordingly and apply linear and stable force onto the two objects 5, so as to push the two objects 5 linearly.

The piston pushing tool further includes two second pivots 42, each of the two push members 2 includes a push portion 21 and a first connection portion 22 connected to each other, each of the two arm members 1 includes a second connection portion 14, the two second pivots 42 are disposed through the first connection portions 22 of the two push members 2 and the second connection portions 14 of the two arm members 1, respectively, and the two push members 2 are rotatable about the two second pivots 42.

Specifically, the first connection portion 22 includes two protruding seats 23 arranged in interval, the second connection portion 14 includes a perforation disposed on the head portion 11, the head portion 11 is interposed between the two protruding seats 23, and the second pivot 42 is disposed through the two protruding seats 23 and the perforation of the head portion 11. Specifically, each of the two arm members 1 is a plate member, and each of the two push members 2 is a plate member, thus being conducive to use in narrow space. The push member 2 has a side area larger than a side area of the head portion 11, and the push member 2 has a thickness smaller than a thickness of the head portion 11.

Preferably, the piston pushing tool further includes a driving mechanism 3, the driving mechanism 3 includes a first base 31, a second base 32 and a threaded rod 33, the first base 31 is rotatably connected to one of the two arm members 1, the second base 32 is rotatably connected to the other of the two arm members 1, the threaded rod 33 is disposed through the first base 31 and the second base 32 and is screwed to at least one of the first base 31 and the second base 32 so that the two arm members 1 can be driven to move by turning the threaded rod 33.

Specifically, the threaded rod 33 includes a driving head portion 34 and a shaft 35 connected to each other, sizes of the first base 31 and the second base 32 are equal to each other, the first base 31 includes a through hole 311, and the second base 32 includes a threaded hole 321. The through hole 311 has a diametric dimension larger than a diametric dimension of the shaft 35, and the shaft 35 is disposed through and screwed to the through hole 311. The first base 31 is located between the second base 32 and the driving head portion 34, and the driving head portion 34 is configured to urge the first base 31 to be close toward the second base 32 so that the two arm members 1 move to be close to each other.

In operation, the user can first directly control the operation portions 13 of the two arm members 1 to be relatively close to the two push members 2 to quickly contact the two objects 5; the user can then turn the threaded rod 33 to force the two arm members 1 so that the operation portions 13 are further moved closer and can drive the two push members 2 to continue pushing the two objects 5, which achieves the effect of keeping the two objects 5 (pistons) relatively far away from each other.

Preferably, the driving head portion 34 includes a first driving portion 341, and a non-circular outer surface of the driving head portion 34 is defined as the first driving portion 341 so that the user can use various tools to be connected to the first driving portion 341 for rotation, thereby producing a large torque to the driving head portion 34 and achieving labor saving purposes. For example, the first driving portion 341 can be driven by an open-end wrench.

Preferably, a handle 6 is disposed on the operation portion 13 of one of the two arm members 1, for providing easy grip; the handle 6 is a column member, and the handle 6 is made of rubber, for providing stable and comfortable grip; and the handle 6 has a diametric dimension larger than a diametric dimension of the operation portion 13 of the arm member 1, for providing large contact area.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A piston pushing tool including:
two arm members being connected to each other, and being relatively movable to be close to each other or to be far away from each other;
two push members configured to be inserted between two objects and connected to the two arm members respectively, the two push members being movable with the two arm members to push the two objects, at least one of the two objects being a piston; and
a driving mechanism, wherein the driving mechanism includes a first base, a second base and a threaded rod, the first base is rotatably connected to one of the two arm members, the second base is rotatably connected to the other of the two arm members, the threaded rod is slidably disposed through the first base, the threaded rod is screwed to and extends through the second base, and the threaded rod is axially blocked by and abutted against a side of the first base remote from the second base, so that the two arm members can be driven to move by turning the threaded rod.

2. The piston pushing tool of claim 1, further including a first pivot, wherein the first pivot is disposed through the two arm members and connects the two arm members to each other.

3. The piston pushing tool of claim 2, wherein each of the two arm members includes a head portion, a body portion and an operation portion connected to one another in sequence, the first pivot is disposed through the body portions of the two arm members, the two push members are connected to the head portions of the two arm members respectively, and when the operation portions of the two arm members move to be close to each other, the head portions of the two arm members move to be far away from each other.

4. The piston pushing tool of claim 1, wherein the threaded rod includes a driving head portion and a shaft connected to each other, the first base includes a through hole, the second base includes a threaded hole, the through hole has a diametric dimension larger than a diametric dimension of the shaft, the shaft is disposed through the through hole and screwed to the threaded hole, the first base is located between the second base and the driving head portion, and the driving head portion is configured to urge the first base to be close toward the second base so that the two arm members move to be close to each other.

5. The piston pushing tool of claim 4, wherein the driving head portion includes a first driving portion, and a non-circular outer surface of the driving head portion is defined as the first driving portion.

6. The piston pushing tool of claim 5, wherein the piston pushing tool further includes a first pivot, and the first pivot is disposed through the two arm members and connects the two arm members to each other; each of the two arm members includes a head portion, a body portion and an operation portion connected to one another in sequence, the first pivot is disposed through the body portions of the two arm members, the two push members are connected to the head portions of the two arm members respectively, and when the operation portions of the two arm members move to be close to each other, the head portions of the two arm members move to be far away from each other; each of the two arm members is a plate member, and each of the two push members is a plate member; the two push members are rotatably connected to the two arm members, respectively; the piston pushing tool further includes two second pivots, each of the two push members includes a push portion and a first connection portion connected to each other, each of the two arm members includes a second connection portion, the two second pivots are disposed through the first connection portions of the two push members and the second connection portions of the two arm members, respectively, the two push members are rotatable about the two second pivots, respectively; the push member has a side area larger than a side area of the head portion, and the push member has a thickness smaller than a thickness of the head portion; sizes of the first base and the second base are equal to each other; the first connection portion includes two protruding seats arranged in interval, the second connection portion includes a perforation disposed on the head portion, the head portion is interposed between the two protruding seats, and the second pivot is disposed through the two protruding seats and the perforation of the head portion; the two arm members are made of metal, and the two push members are made of metal; the operation portion and the head portion define an included angle larger than 110 degrees therebe- tween; a handle is disposed on the operation portion of one of the two arm members, the handle is a column member, the handle is made of rubber, and the handle has a diametric dimension larger than a diametric dimension of the operation portion of each of the two arm members.

7. The piston pushing tool of claim 1, wherein each of the two arm members is a plate member, and each of the two push members is a plate member.

8. The piston pushing tool of claim 1, wherein the two push members are rotatably connected to the two arm members, respectively.

9. The piston pushing tool of claim 8, further including two second pivots, wherein each of the two push members includes a push portion and a first connection portion connected to each other, each of the two arm members includes a second connection portion, the two second pivots are disposed through the first connection portions of the two push members and the second connection portions of the two arm members, respectively, the two push members are rotatable about the two second pivots, respectively.

\*  \*  \*  \*  \*